Patented Nov. 22, 1932

1,888,827

UNITED STATES PATENT OFFICE

EMIL KLARMANN, OF JERSEY CITY, AND LOUIS W. GATYAS, OF BLOOMFIELD, NEW JERSEY, ASSIGNORS TO LEHN & FINK, INC., OF BLOOMFIELD, NEW JERSEY, A CORPORATION OF NEW YORK

MONOETHERS OF RESORCINOL

No Drawing.    Application filed March 12, 1931.   Serial No. 522,161.

The present invention relates to resorcinol derivatives and more particularly to derivatives of resorcinol having high bactericidal efficiency.

It is well known that resorcinol, although a phenolic body, is low in bactericidal efficiency, being distinctly weaker than phenol. We have, however, investigated the compounds of resorcinol and have produced compounds thereof which have hitherto not been known and which we have found to have high bactericidal efficiency, in general, at least six times that of phenol with respect to B. typhosus at 37° C.

The highly effective bactericidal compounds which we have produced are the resorcinol mono-ethers in which the substituting ether radical has at least three carbon atoms. The substituting ether radical may be either alkyl, aryl or cyclic and may, in general, be produced by condensing the resorcinol with a halogen derivative of the substituting ether radical in the presence of alkali, either in aqueous, alcoholic or mixed solution and either with or without an organic solvent; or the resorcinol may be condensed with a halogen derivative of the substituting ether radical in the presence of an organic solvent without the presence of alkali. The following examples illustrate the production of such ethers in accordance with the present invention.

*Example I:*—36.7 grams of resorcinol and 15 grams of n-amyl bromide are dissolved in 50 cc. of alcohol. The solution is brought to the boiling point and, while boiling, 350 cc. of normal alcoholic solution of caustic potash are added slowly. On completion of the reaction, the reaction mixture is extracted repeatedly with an aqueous solution of alkali, which removes the ether, leaving undissolved any di-ether which may have been formed in the reaction. The separated alkaline solution of the mono-ether is acidified to liberate the mono-ether and the latter may then be separated by vacuum or steam distillation or by extraction with an immiscible organic solvent, such as ether, benzol or the like, and crystallized from the latter. The resulting resorcinol n-amyl ether has a boiling point of 140° C. at 6 mm. pressure absolute, and has a very high bactericidal value, having a phenol coefficient of 40 with respect to bacteria typhosus at 37° C.

Other mono-ethers of resorcinol with substituting alkyl radicals of more than three carbon atoms may be similarly produced, employing the halogen derivatives of the corresponding radicals. Thus, the mono-isoamyl ether of resorcinol has a boiling point of 132° C. at 3 mm. pressure absolute and has a phenol coefficient of 24.3. The mono-n-butyl ether of resorcinol, produced in a similar manner, has a boiling point of 132° C. at 5 mm. absolute and a phenol coefficient exceeding 20. The mono-n-propyl ether of resorcinol has a boiling point of 117° C. at 4 mm. absolute and a phenol coefficient exceeding 6.5. The higher alkyl ethers of resorcinol have also been produced, such as the mono-hexyl, mono-heptyl, mono-octyl and the like, and are found to have progressively increasing boiling points and to be very effective bactericidal agents. The mono-n-hexyl ether is particularly high in bactericidal value, having a phenol coefficient of 47 with respect to bacteria typhosus.

The mono-ethers of resorcinol with cyclic radicals in the substituting ether groups such as the polymethylenes, aromatic and condensed aromatic groups are likewise found to have high bactericidal value. Thus, the polymethylene mono-ethers of resorcinol, for example, the cyclo-propyl, cyclopentyl, cyclohexyl ethers, which has a boiling point of 160° C. at 6 mm. absolute pressure and a melting point of 123° C. has a phenol coefficient exceeding 18. The monoaryl ethers are likewise found to have very high bactericidal value. The following example illustrates a typical method of production of such mono-ethers.

*Example No. II:*—Resorcinol, preferably a slight excess over that required for reaction, is dissolved in xylene, toluene or other suitable solvent; for example, 25.3 grams of resorcinol in 75 cc. of xylene. The solution is boiled, and while boiling, 32.2 grams of p-chloro-benzyl chloride is added drop by drop and the heating continued until the evolution of hydrogen chloride fumes practically ceases. The reaction mixture is washed with water to remove the excess of resorcinol, and then with an aqueous solution, made somewhat alkaline with caustic soda or caustic potash to remove the resorcinol mono-p-chloro-benzyl ether. The solution of the latter is acidified to cause separation of the ether, and the latter may then be vacuum distilled off or extracted with organic solvents such as xylene, carbon tetrachloride, ether or the like. The resulting compound, the mono-para-chloro-benzyl ether of resorcinol, has a melting point of 73° C., a boiling point of 235° C. at 13 mm. absolute pressure, and has a very high phenol coefficient, exceeding 70 with respect to B. typhosus. Other mono-aryl ethers of resorcinol may be produced in a similar manner, such as the phenyl, naphthyl, anthracene and benzyl ethers and certain of these mono-aryl ethers, such as monophenyl ether, have been produced by other methods. These are likewise found to possess high bactericidal efficiency. The following are typical, illustrating the properties of such resorcinol mono-ethers, in addition to the para-chloro-benzyl ether above referred to.

Resorcinol mono-benzyl ether, which has a boiling point of 200° C. at 5 mm. pressure absolute, and a melting point of 70° C., has a phenol coefficient of 20 (B. typhosus).

Resorcinol mono-phenylethyl ether has a boiling point of 205° C. at 6 mm. pressure absolute, a melting point of 42° C., and a phenol coefficient of 39 (B. typhosus).

It is readily apparent that the substituting ether radical, which has at least three carbon atoms, may contain various substituting groups without departing from the scope of the present invention.

We claim:

1. As a composition of matter, a resorcinol mono-ether in which the substituting ether radical is an unsubstituted hydrocarbon radical having at least three carbon atoms, said ether having a high bactericidal efficiency.

2. A resorcinol mono-ether in which the substituting ether radical is an unsubstituted alkyl radical having at least three carbon atoms, said ether having a high bactericidal efficiency.

3. A resorcinol mono-ether in which the substituting ether radical is an unsubstituted polymethylene radical, said ether having a high bactericidal efficiency.

4. A resorcinol mono-ether in which the substituting ether radical is an unsubstituted hydrocarbon radical containing an aryl group, said ether having a high bactericidal efficiency.

5. A resorcinol mono-amyl ether.

6. A resorcinol mono-normal hexyl ether.

7. Resorcinol mono-cyclo-hexyl ether.

EMIL KLARMANN.
LOUIS W. GATYAS.